(12) United States Patent
Cline

(10) Patent No.: US 9,827,889 B1
(45) Date of Patent: Nov. 28, 2017

(54) PILLOW DEVICE

(71) Applicant: Janet E. Cline, Garner, NC (US)

(72) Inventor: Janet E. Cline, Garner, NC (US)

( * ) Notice: Subject to any disclaimer, the term of this patent is extended or adjusted under 35 U.S.C. 154(b) by 0 days.

(21) Appl. No.: 15/205,237

(22) Filed: Jul. 8, 2016

(51) Int. Cl.
*B60N 2/46* (2006.01)
*A61G 13/12* (2006.01)

(52) U.S. Cl.
CPC ......... *B60N 2/466* (2013.01); *A61G 13/1235* (2013.01); *B60N 2/4673* (2013.01)

(58) Field of Classification Search
CPC .... A47C 7/546; A47C 20/023; B60N 2/4673; B60N 2/4666; A61G 13/1235; A61G 13/124; A61G 7/075; A61G 7/1092; A61G 7/1094
See application file for complete search history.

(56) References Cited

U.S. PATENT DOCUMENTS

| | | | | |
|---|---|---|---|---|
| 3,074,762 A | * | 1/1963 | Samuel | A47C 7/546 297/411.26 |
| 4,876,755 A | * | 10/1989 | Parrish | A47C 7/425 297/230.1 |
| 4,982,921 A | | 1/1991 | Sanders | |
| 5,332,288 A | | 7/1994 | Coates | |
| 5,605,374 A | | 2/1997 | Perry | |
| 5,692,711 A | * | 12/1997 | Tucker | B60N 2/4666 248/118 |
| 5,979,987 A | | 11/1999 | Rich | |
| D637,434 S | | 5/2011 | Lovinger et al. | |
| 2002/0043861 A1 | * | 4/2002 | Meadows | A47C 7/54 297/411.21 |
| 2008/0141462 A1 | * | 6/2008 | Woods | A47C 16/00 5/655 |
| 2008/0185895 A1 | * | 8/2008 | Passage | B60N 2/4673 297/411.22 |
| 2008/0224498 A1 | * | 9/2008 | Hughes | B60N 2/4666 296/153 |
| 2009/0256384 A1 | * | 10/2009 | Hughes, Jr. | B60N 2/4235 296/153 |
| 2013/0127217 A1 | * | 5/2013 | Goetsch | A47C 27/086 297/227 |
| 2013/0341979 A1 | * | 12/2013 | Girard | A47C 7/021 297/227 |
| 2014/0062148 A1 | | 3/2014 | Agosto | |
| 2015/0097392 A1 | * | 4/2015 | Locke | B60N 2/466 296/153 |
| 2015/0115675 A1 | | 4/2015 | Winkelman | |
| 2016/0249745 A1 | * | 9/2016 | Marton | A47C 31/007 |
| 2016/0257226 A1 | * | 9/2016 | Quinlan | B60N 2/4666 |

\* cited by examiner

*Primary Examiner* — David E Sosnowski
*Assistant Examiner* — Eric Kurilla

(57) ABSTRACT

A pillow device couples to a vehicle interior to provide enhanced comfort to a user's elbow while driving. The device includes a substantially cylindrical cover having a cylindrical medial portion and a pair of hemispherical ends. The cover has a planar section parallel to a longitudinal axis of the cover. Stuffing is positioned within the cover. A first fastener is coupled to the cover wherein the cover is configured for being coupled to a surface of an interior side of a vehicle door.

6 Claims, 3 Drawing Sheets

PILLOW DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to pillow devices and more particularly pertains to a new pillow device for coupling to a vehicle interior to provide enhanced comfort to a user's elbow while driving.

BRIEF SUMMARY OF THE INVENTION

An embodiment of the disclosure meets the needs presented above by generally comprising a substantially cylindrical cover having a cylindrical medial portion and a pair of hemispherical ends. The cover has a planar section parallel to a longitudinal axis of the cover. Stuffing is positioned within the cover. A first fastener is coupled to the cover wherein the cover is configured for being coupled to a surface of an interior side of a vehicle door.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
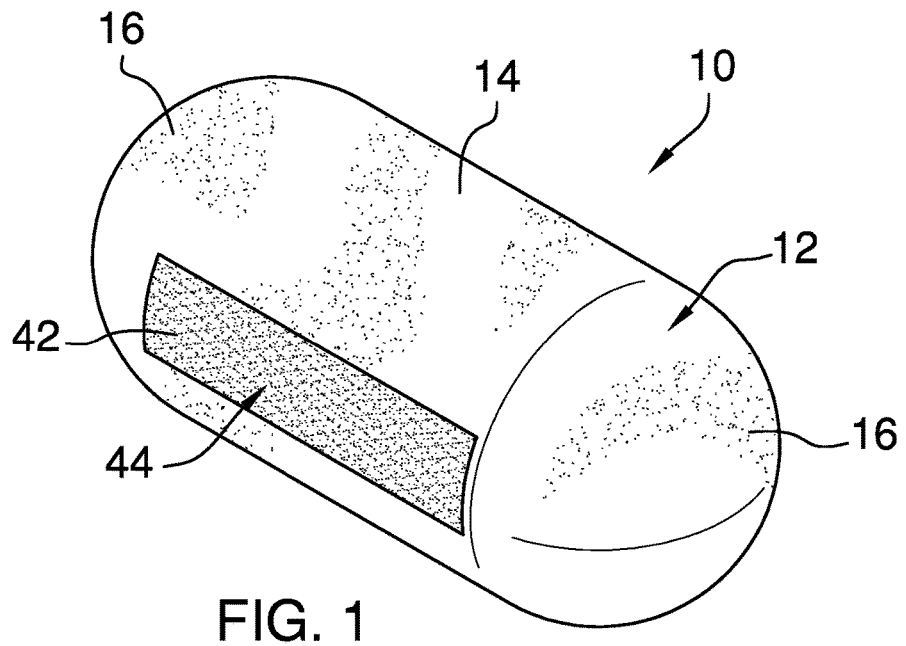
FIG. 1 is a top front side perspective view of a pillow device according to an embodiment of the disclosure.
Figure 2:
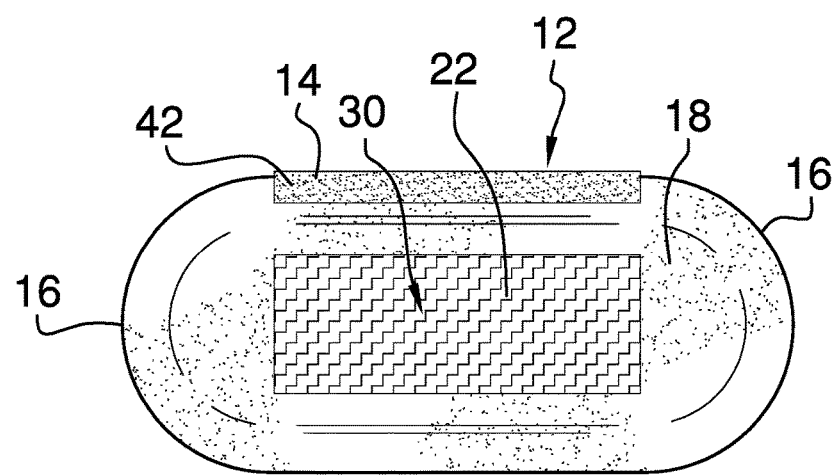
FIG. 2 is a bottom view of an embodiment of the disclosure.
Figure 3:
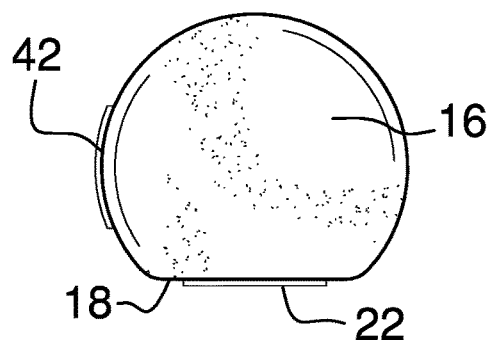
FIG. 3 is a front view of an embodiment of the disclosure.
Figure 4:
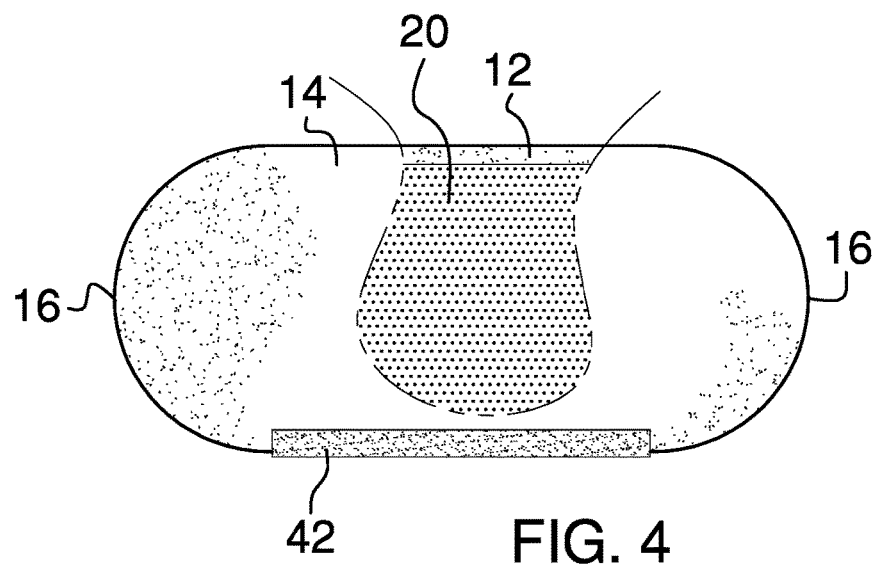
FIG. 4 is a partial cut-away top view of an embodiment of the disclosure.
Figure 5:
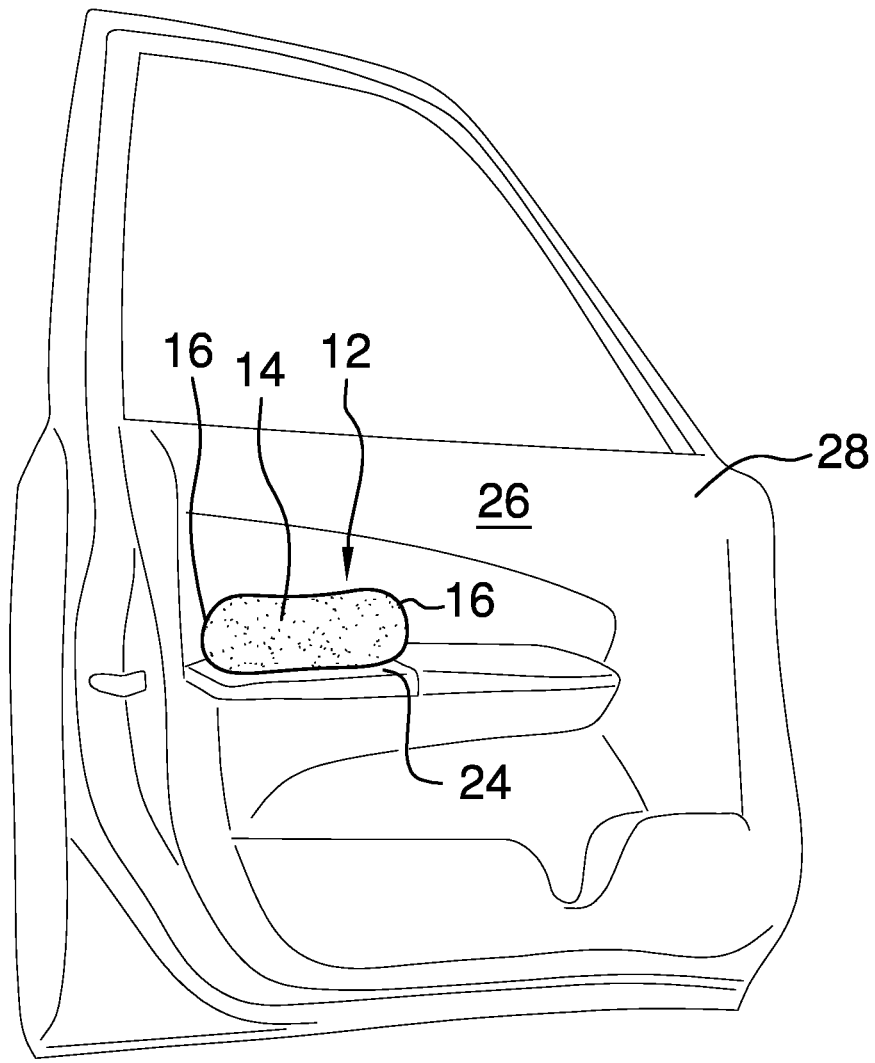
FIG. 5 is a top front side perspective view of an embodiment of the disclosure in use.

With reference now to the drawings, and in particular to FIGS. 1 through 5 thereof, a new pillow device embodying the principles and concepts of an embodiment of the disclosure and generally designated by the reference numeral 10 will be described.

As best illustrated in FIGS. 1 through 5, the pillow device 10 generally comprises a cover 12. The cover 12 is made of a flexible and soft material such as cotton or the like. The cover 12 is substantially cylindrical having a cylindrical medial portion 14 and a pair of hemispherical ends 16 such that the cover 12 when fully expanded is substantially obround. The cover 12 has a planar section 18 parallel to a longitudinal axis of the cover 12. The planar section 18 of the cover 12 extends into the hemispherical end portions 16 of the cover 12. Stuffing 20 of a conventional material is positioned within the cover 12 to provide stiffness to the cover 12 to generally retain the obround shape while providing compression to enhance comfort to a body part, such as an elbow, resting on the device 10.

A first fastener 22 is coupled to the cover 12 wherein the cover 12 is configured for being coupled to a surface 24 of an interior side 26 of a vehicle door 28. The first fastener 22 is a hook portion 30 of a hook and loop fastener to allow the first fastener 22 to be attached directly to a fabric or other suitable material on the surface 24. Alternatively, the first fastener 22 may be provided with a complementary portion of hook and loop fastener configured for positioning on the surface 24 in the event surface 24 is not readily suited for engagement by the hook portion 30. The first fastener 22 is rectangular in shape and centered in the planar section 18 of the cover. A second fastener 40 is coupled to the cover 12. The second fastener 40 is another hook portion 42 of hook and loop fastener. The second fastener 40 extends along a lateral side 44 of the cover 12 parallel to the first fastener 22. The second fastener 40 is laterally aligned and coextensive with the first fastener 22. Thus, the device 10 is positionable to rest on adjacent substantially perpendicular surfaces.

In use, the device 10 is positioned on an existing arm rest and against in inwardly facing surface of a vehicle to enhance padding and comfort for a user's elbow.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pillow device for coupling to an interior side of a vehicle door, said pillow device comprising:
    a cover, said cover being substantially cylindrical having a cylindrical medial portion and a pair of hemispherical ends defining respective convex outer end surfaces, said cover having a planar section parallel to a longitudinal axis of said cover;
    stuffing positioned within said cover;
    a first fastener coupled to said cover wherein said cover is configured for being coupled to a surface of the interior side of the vehicle door; and
    a second fastener coupled to said cover, said second fastener being positioned on a lateral side of said cover; wherein said second fastener and said first fastener are the same length and width and are located in the same longitudinal position along a longitudinal axis of said cover.

2. The device of claim 1, further comprising said first fastener being a hook portion of a hook and loop fastener.

3. The device of claim 1, further comprising said first fastener being rectangular in shape.

4. The device of claim 3, further comprising said first fastener being centered in said planar section of said cover.

5. The device of claim 1, further comprising said second fastener being a hook portion of a hook and loop fastener.

6. A pillow device for coupling to an interior side of a vehicle door, said pillow device comprising:
    a cover, said cover being substantially cylindrical having a cylindrical medial portion and a pair of hemispherical ends defining respective convex outer end surfaces, said cover having a planar section parallel to a longitudinal axis of said cover;
    stuffing positioned within said cover;
    a first fastener coupled to said cover wherein said cover is configured for being coupled to a surface of the interior side of the vehicle door, said first fastener being a hook portion of a hook and loop fastener, said first fastener being rectangular in shape, said first fastener being centered in said planar section of said cover; and
    a second fastener coupled to said cover, said second fastener being positioned on a lateral side of said cover, said second fastener and said first fastener are the same length and width and are located in the same longitudinal position along a longitudinal axis of said pillow, said second fastener being a hook portion of a hook and loop fastener.

* * * * *